United States Patent [19]
Seiler

[11] 3,963,298
[45] June 15, 1976

[54] SOCKET CONNECTION OF TUBES OR TUBULAR ELEMENTS, IN PARTICULAR OF METAL

[76] Inventor: Georg Seiler, Pachmayrplatz II, Munich 81, Germany

[22] Filed: Jan. 8, 1973

[21] Appl. No.: 321,860

[30] Foreign Application Priority Data
May 29, 1972 Germany............................ 2226151

[52] U.S. Cl......................... 339/95 R; 277/DIG. 2; 285/231
[51] Int. Cl.²............................................. H01R 7/08
[58] Field of Search ................ 339/94, 95; 285/104, 285/105, 110, 231, 232, 345; 277/DIG. 2; 174/78, 84 S

[56] References Cited
UNITED STATES PATENTS

| | | | |
|---|---|---|---|
| 1,930,194 | 10/1933 | Dillon | 285/104 |
| 2,245,153 | 6/1941 | McWane | 285/110 |
| 2,755,109 | 7/1956 | Risley | 285/232 |
| 2,966,539 | 12/1960 | Sears et al. | 285/231 |
| 3,724,880 | 4/1973 | Seiler | 285/105 |

FOREIGN PATENTS OR APPLICATIONS

| | | | |
|---|---|---|---|
| 1,954,247 | 6/1971 | Germany | 285/345 |
| 6,406,152 | 1/1965 | Netherlands | 285/105 |

*Primary Examiner*—Joseph H. McGlynn
*Attorney, Agent, or Firm*—Whittemore, Hulbert & Belknap

[57] ABSTRACT

The invention relates to a socket connection of tubes or tubular elements, in particular of metal, with a plug-in (male) end and a socket (female) end which accommodates the former with radial clearance and has a radially extending inside shoulder against which supports itself in axial direction a one-piece sealing and anti-thrust ring with a foot section and several retaining elements spaced in circumferential direction and engaging with an inside edge of the periphery of the plug-in end whose head portion, located inside axially, seals the annual space between the socket end and the plug-in end.

11 Claims, 10 Drawing Figures

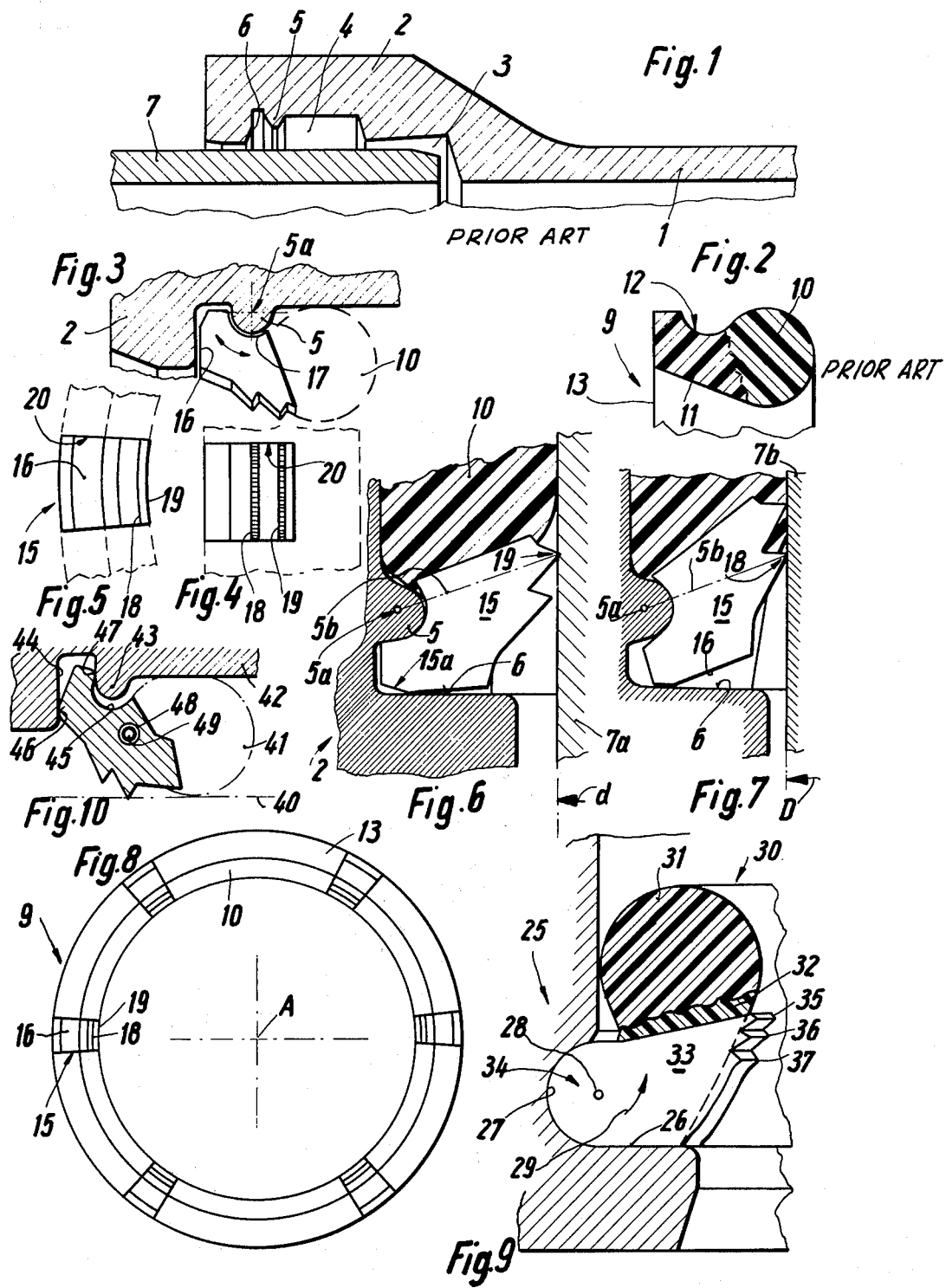

SOCKET CONNECTION OF TUBES OR TUBULAR ELEMENTS, IN PARTICULAR OF METAL

Socket connections with a seal and an anti-thrust provision have been known for a long time. For instance, the U.S. Pat. No. 2,201,372 shows a socket connection in which a sealing ring is inserted in the annular space between female and male end, retaining elements being vulcanized in said annular space. They have an inside edge capable of engaging the outside contour of the male end when the sealing ring is put under tension by means of a special split clamping ring. For this purpose the elastic clamping ring is introduced from the outside and caused to snap in between the end of the seal located axially on the outside and on inside shoulder of the socket, and that in such a manner that the retaining elements can support themselves directly against this clamping ring.

It is also known, however, to design the sealing ring integral with the retaining elements so that a special preloading ring is not required. For instance, the U.S. Pat. No. 2,230,725 has an anti-thrust provision with a lip type sealing ring to whose ends oriented outward axially are vulcanized thrust plates closely spaced in circumferential direction and serving to absorb the axial pressure acting upon the seal and to transmit it to an inside shoulder of the female end. The inside edge of each thrust plate is blade shaped so that they can engage the periphery of the male end, securing the female end against thrust forces. This known arrangement has the disadvantage that the thrust plates must be relatively close together in circumferential direction so as to be able to absorb dependably the forces acting upon the sealing ring in axial direction and to transmit them to the female end, thereby preventing damage or destruction of the sealing ring. The thrust plates thus have to perform a double function. Concerning all known socket connections of this type it must be added that the anti-thrust force of the arrangement changes as a function of the changes in the outside diameter of the male end. But such diameter changes cannot be avoided, to which may also have to be added diameter changes of the socket. This causes the respective inclination of the thrust plates or other retaining elements to change, which inclination is governing for the retaining force of the retaining elements.

To become independent thereof it is known to provide the outside of the male end with grooves or beads, behind which or in which the inside edges of the retaining elements engage upon the introduction of the male end so that a form-closing connection is obtained. This is exemplified in the Italian Pat. No. 594,113 and the German Disclosure No. 1,269,849. These known socket connections are relatively expensive to produce because they necessitate additional machining of the male end, which machining has to be performed at the site of installation, as a rule. It is true that the radial clamping force becoming effective against an annular zone of the male end is reduced in these known arrangements. However, this possible advantage is largely canceled out by the disadvantage that the male end is considerably weakened by the machining of the thrust groove into it or by the welding operation when a thrust bead is welded on so that the male end can be damaged even by weaker radial forces.

In contrast thereto, it is the objective of the invention to further develop a socket connection of the kind described at the outset so that, on the one hand, securing the male end against thrust forces is made possible regardless of the arrangement and the support of the sealing ring in the female end and, on the other hand, the necessity of machining the male end is obviated and, at the same time, essentially the same force counteracting thrust forces becomes effective at all times, regardless of diameter changes of the male end within the permissible tolerance range.

According to the invention, this problem is solved in that each retaining element is firmly embedded in a radially extending groove of the foot section which may preferably consist of an elastomeric material harder than the material of the head section; that each retaining element is directly supported, in assembled condition of the sealing and antithrust ring, by the inside wall of the female end so as to be able to pivot, and that each retaining element has at least two inside edges or groups of such inside edges, provided to engage the periphery of the male end and spaced differently from the pivot axis of the retaining element axially and radially, depending upon the permissible tolerance of the diameter of the male end.

The result of the novel arrangement is that the foot section of the sealing ring is enabled to support itself securely against the inside shoulder of the socket, the retaining elements not being needed for this purpose. The latter are independent of the foot section to the extent that they can pivot, independent of said foot section, about a pivot axis at the inside of the socket, the rigid connection between the retaining elements and the foot section providing a force automatically returning the retaining elements into their initial position. Therefore, the retaining elements may be spaced relatively far apart circumferentially so that the combined integral ring can easily be introduced into the socket. But the design and configuration of the retaining elements enable them, above all, to have another inside edge or group of inside edges engage the tube end, depending upon the diameter of the male end. This makes an optimum engaged position of the inside edges at the periphery of the male end obtainable at all times, regardless of changes in tube diameter. Advantageously, the arrangement is such that the connecting line between the pivot axis and the respective inside edge entering into engagement include an angle with the center-line of the socket connection which always remains approximately the same. This assures that always the same securing force is obtained, regardless of changes in the diameter of the male end. It is of special advantage when the contour of each retaining element fits the contour of the foot section of the sealing ring, particularly when this foot section consists of a less elastic material than the sealing ring's head section which serves the sealing action.

The invention is explained below in greater detail by way of diagrammatic drawings of several embodiments.

FIG. 1 shows two tubular elements, pushed into each other, of a typical, known socket connection.

FIG. 2 is a cross section in larger scale of a sealing ring of a known typical design as frequently used in the socket connection per FIG. 1.

FIG. 3 is a section similar to FIG. 2 and shows a first embodiment of a retaining element which may be embedded in the foot section of a sealing ring according to FIG. 2.

FIG. 4 is an inside view in radial direction of a retaining element per FIG. 3.

FIG. 5 is an axial front view of the outside face end of a retaining element per FIG. 3.

FIGS. 6 and 7 show, in enlarged scale, two different engaged positions of the retaining element when the male ends of tubular elements have different diameters.

FIG. 8 is a top view of a combined integral sealing and antithrust ring with retaining elements per FIG. 3, while FIGS. 9 and 10, in a view similar to FIGS. 6 and 3, respectively, represent a modified embodiment of a sealing and antithrust ring according to the invention.

As is evident from FIG. 1, a tubular element, a cutaway portion of which only is shown, has at one end, the socket (female) end 2, a socket in which can be inserted with radial clearance the plug (male) end 7 of another tubular element. In inserted condition there is provided in the interior of the socket a recess 3 which permits a relative pivoting motion of the two tubular elements within predetermined limits. Adjacent to this recess a sealing chamber 4 is formed, bounded outward axially by a radially extending inside shoulder 6 of the socket (female) end. Spaced from shoulder 6, in the area of the sealing chamber 4, there extends an annular bead 5.

Before the male end 7 is inserted a sealing ring such as of the design per FIG. 2, is inserted into the sealing chamber 4. The sealing ring consists of a soft rubber head section 10 which deforms upon the insertion of the male end 7 into the sealing chamber 4 and assures the seal between the two tubular elements. As a rule, this head section is under the influence of the internal pressure in the line, thereby increasing the sealing effect. A pullout of the sealing ring from the sealing chamber 4 is prevented by the shoulder 6 in connection with the foot section 11 of the sealing ring 9. So that the relatively soft material of the head section 10 will not be pushed out of the sealing chamber 4, the foot section 11 of sealing ring 9 is composed of a harder elastomeric material in a certain sealing ring as shown in FIG. 2, a fillet groove 12 engaging the annular bead 5 and the straight face area 13 resting against the annular shoulder 6 of the socket. To the extent described so far the socket connection is known.

According to the invention, an antithrust provision is made in the foot section of a sealing ring such as the one according to FIG. 2, for which purpose there are provided in the foot section radial cuts, mutually spaced in circumferential direction as exemplarily evident from FIG. 8, in which cuts retaining elements are inserted. In the example shown, each retaining element 15 is of a contour essentially matching the contour of the foot section 11 of the sealing ring per FIG. 2. The retaining elements are firmly vulcanized into the radial grooves 20 of the sealing ring. If required, there may be provided in the retaining element a groove or a hole extending in circumferential direction, penetrated by the elastomeric material to anchor the retaining element better.

On its back side or radial outside the retaining element 15 has a fillet groove extending in circumferential direction, matching the profile of the bead 5a of the socket 2. In the assembled condition of the ring the groove covers the bead and forms a pivot axis 5a, about which the retaining element 15 can pivot within limits as indicated by the double arrow in FIG. 3. It may be seen from FIG. 3 that a clockwise pivoting motion of the retaining element is limited outwardly in that the retaining element has an outer strike surface 16 which, in the end position, rests against the radial annular shoulder 6 of the socket.

On its inside the retaining element has at least two gripping edges 18, 19 gripping radially inward over the profile of the foot section. As is evident from FIG. 3, and even more clearly from FIGS. 6 and 7, the spacings of the edges 18 and 19 from the pivot axis 5a of the retaining element are different axially and radially in the assembled condition of the sealing ring. The significance of this characteristic will yet be discussed below in greater detail.

After the integral sealing ring with the vulcanized or cemented or otherwise fastened retaining elements has been inserted in the socket in the usual manner, which is facilitated particularly in that the retaining elements according to FIG. 8 are spaced noticeably further apart mutually than the peripheral length of each retaining element, the male end 7 may be plugged in. In so doing, the retaining elements are so tilted about the tilting axis 5a due to the inside edges engaging the outside diameter of the male end that no noteworthy force acts counter to the inward motion of the male end 7. At the same time, the head end 10 of the sealing ring is deformed by the insertion so that the sealing ring essentially fills out the sealing chamber 4 remaining between the male end and the female end.

When the insertion of the male end is completed, the head section 10 develops a sufficiently strong elastic counterforce due to the deformation it experienced when the male end was inserted, to tilt the retaining elements back so that at least one of the edges engages the outside diameter of the male end.

It depends upon the diameter of the male end which of the inside edges 18 or 19, along or predominantly engages its outside diameter.

It is assumed in FIG. 6 that the outside diameter of the male end 7a is at the lower limit of the diameter tolerance. Due to the elastic counterforce of the head end 10 of the seal, the retaining elements are pivoted back clockwise in FIG. 6 until the inside edge 19 engages the outside diameter of the relatively thin tube indicated by the letter $d$. Now, if thrust forces act upon the male end or the socket due to internal forces or due to the pressure of the medium inside, these thrust forces tend to pivot the retaining elements even further clockwise beyond the position shown in FIG. 6. This causes the edge 19 to dig into the surface of the male end 7a, securing it against all thrust forces. This engagement is further improved in that the internal pressure in the tube presses against the head section 10 of the sealing element which transmits this pressure at least in part to the retaining elements in the form of a clockwise pivoting motion. As for the rest, these forces are transmitted directly, independent of the retaining elements, to the shoulder 6 of the socket through the foot section between two adjacent retaining elements. As may be seen from FIG. 6, care is taken through an appropriate bevel or radius 15a that nothing impedes the pivoting motion of the retaining elements.

FIG. 6 shows the position of the socket connection during operation. A connecting line from the pivot axis 5a to the engaged edge 19, said connecting line being designated 5b, exemplarily assumes the desired inclination shown in FIG. 6. Under this inclination, defined clamping forces are exerted upon the diameter of the male end 7a. If the inclination changes, the clamping forces change also.

In order to make sure that the clamping force is just as dependable when male end 7b whose outside diameters D are close to the upper limit of the tolerance range are introduced without having to make modification, the second edge 18 is disposed and designed in a very definite manner relative to the pivot axis 5a. FIG. 7 makes this plain. This FIG. shows the tube 7b of larger diameter inserted in the same socket as in FIG. 6. Again, after insertion, the head end of the sealing ring pivots the retaining elements into the engaged position. But the retaining elements cannot be pivoted back clockwise as far as shown in FIG. 6. Instead of the edge 19 it is mainly the edge 18 of the retaining elements which engages the diameter of the male end. The clamping is effected in the manner described, except that now the connecting line 5b goes from the pivot axis 5a to the engaged edge 18. A comparison of FIGS. 6 and 7 shows that in both cases the connecting line 5b has essentially the same inclination relative to the centerline of the socket connection, which axis is designated as A in FIG. 8.

FIG. 9 illustrates a modified embodiment in which there is provided at the foot section 32 of the sealing 30 and in the corresponding cross-sectional area of the retaining elements, for the formation of the pivot axis, a radial bead 34 engaging a corresponding recess 27 in the female end when the ring is inserted in the sealing chamber of the socket. The annular groove 27 is directly adjacent to the radial shoulder 26 of the socket so that the retaining elements can be pivoted about the axis 28 in the direction af arrow 29. In the example shown, the sealing ring 30 has a head section 31 of softer elastomeric material and a foot section 32 of harder elastomeric material. Each retaining element has at its inside three engaging edges 35, 36, 37, each spaced differently axially and radially from the pivot axis 28, and that in such a manner that the middle edge 36, for example, becomes actve primarily when a tube is inserted whose outside diameter essentially matches the nominal diameter. The inside edge 35 becomes active primarily when a male end with an outside diameter close to the lower limit of the tolerance range is inserted, while analogously the inside edge 37 becomes active when a diameter at the upper limit of the tolerance range is involved. The effect of this seal is essentially the same as that of the embodiment described earlier.

As a matter of couse, the invention is also applicable to sealing rings whose foot section and head section are composed of the same elastomeric material. However, a design is preferred particularly where the foot section consists of a harder material.

Also, the head section may be of a design other than the example shown, in the form of a lip type seal.

In order to increase further the range of various outside diameters of the smooth tube end in which the tube end can stll be secured reliably with the same ring, the arrangement may be according to FIG. 10. The general design of the ring is like the embodiment according to FIGS. 2 to 7. However, the foot 46, 47 of the retaining element is so designed that where tube ends of extremely small diameter are involved, the teeth of the retaining element can engage the outside diameter of the tube indicated at 40 without the groove 45 being supported by the annular rib 43 of the socket. Accordingly, the radial clamping forces are dependably transmitted to the socket in that occurring axial forces tend to pivot the retaining elements, the front edge 46 of the foot supporting itself against the shoulder 44 and wedging itself tight in the position shown in FIG. 10 due to the rear edge 47 making contact with the lateral surface of rib 43 facing the shoulder. At larger tube diameters, the groove 45 positions itself against the rib 43, and the effects described in connection with FIGS. 6 and 7 occur.

To promote the wedging effect of the retaining elements, the edges 46 and 47 of the retaining elements and/or the mating surfaces of the socket may be roughened, such as by knurling.

To secure the retaining elements in the foot section of the rubber ring, the retaining elements of all embodiments may either present at their faces oriented in circumferential direction protrusions or projections embedded in the adjacent rubber of the foot section, or they may have a hole approximately extending in circumferential direction for the rubber to engage or for added anchoring elements projecting beyond the face into the adjacent rubber to be inserted. The insertion of a helical spring 49 has proven to be particularly advantageous which reaches all retaining elements through the holes 48, (FIG. 10) and, if applicable, cements a closed ring partly going through the retaining elements and partly embedded in the rubber of the foot section.

I claim:

1. Socket connection for a pair of tubular elements, in particular of metal, one of which has a male end and the other of which has a female end accommodating the male end of the one tubular element with radial clearance, said female end having a terminal portion presenting a radially extending inside shoulder, including a sealing and antithrust ring with a foot section positioned within the female end of the other tubular element supported against said inside shoulder, several retaining elements distributed in circumferential direction around the foot section and having an inside edge engaging the outside diameter of the male end of the one tubular member and a head section sealing the annular space between the female end and the male end of the tubular elements, characterized in that each retaining element is firmly embedded in a radially extending groove in a foot section consisting specifically of an elastomeric material harder than that of the head section and in that each retaining element in the assembled condition of the sealing and antithrust ring is directly supported for movement about a pivot axis by the inside wall of the female end of the other tubular member so as to be pivotable and in that each retaining element presents at least two inside edges intended to engage the outside diameter of the male end of the one tubular member which are spaced differently from the pivot axis axially and radially of the tubular members, depending upon the permissible diameter tolerance of the male end of the one tubular member wherein the axial and radial spacings of the two or more inside edges from the pivot axis of the retaining element have a connecting line from the pivot axis to a respective inside edge in engagement with the male end which always has approximately the same inclination relative to the tubular elements.

2. Socket connection according to claim 1, characterized in that each retaining element has three different inside edges, the middle one of which engages the male end if the latter's diameter is the nominal diameter.

3. Socket connection according to claim 1, characterized in that each retaining element has a strike surface which cooperates with the inside shoulder to limit the pivoting motion of the retaining element.

4. Socket connection according to claim 1, characterized in that the contour of each retaining element essentially matches the contour of the foot section of the sealing and antithrust ring.

5. Socket connection according to claim 1, characterized in that the retaining elements present grooves or beads extending in circumferential direction, cooperating in the assembled condition of the sealing and antithrust ring with a common annular bead in the socket to form the pivot axis.

6. Socket connection according to claim 1, characterized in that the mutual spacing of the retaining elements in circumferential direction is considerably greater than the peripheral extent of each retaining element.

7. Socket connection according to claim 1, characterized in that the retaining elements oppose each other in diametric pairs.

8. Socket connection according to claim 1, characterized in that the retaining elements are additionally anchored in the foot section of the sealing and antithrust ring by projections protruding beyond their faces oriented in circumferential direction.

9. Socket connection according to claim 1, characterized in that the foot of each retaining element engages an annular recess between the inside shoulder and a female end inside annular, radially extending counter surface spaced from and opposing said shoulder axially and is radially movable to a limited extent in said recess and has two clamping edges which are respectively supported by the inside shoulder and the counter-surface, are spaced from each other radially and are so disposed and designed that they wedge the foot of the retaining element tight in every radial position within the recess under the influence of axial forces to be absorbed.

10. Socket connection for a pair of tubular elements, in particular of metal, one of which has a male end and the other of which has a female end accommodating the male end of the one tubular element with radial clearance, said female end having a terminal portion presenting a radially extending inside shoulder, including a sealing and antithrust ring with a foot section positioned within the female end of the other tubular element supported against said inside shoulder, several retaining elements distributed in circumferential direction around the foot section and having an inside edge engaging the outside diameter of the male end of the one tubular member and a head section sealing the annular space between the female end and the male end of the tubular elements, characterized in that each retaining element is firmly embedded in a radially extending groove in a foot section consisting specifically of an elastomeric material harder than that of the head section and in that each retaining element in the assembled condition of the sealing and antithrust ring is directly supported for movement about a pivot axis by the inside wall of the female end of the other tubular member so as to be pivotable and in that each retaining element presents at least two inside edges intended to engage the outside diameter of the male end of the one tubular member which are spaced differently from the pivot axis axially and radially of the tubular members, depending upon the permissible diameter tolerance of the male end of the one tubular member, wherein the retaining elements are additionally anchored in the foot section of the sealing and antithrust ring by projections protruding beyond their faces oriented in a circumferential direction, which projections are provided by a common string-like helical spring led through peripheral holes in the retaining elements, which spring is embedded in the foot section of the sealing and antithrust ring between adjacent retaining elements.

11. Socket connection for a pair of tubular elements, in particular of metal, one of which has a male end and the other of which has a female end accommodating the male end of the one tubular element with radial clearance, said female end having a terminal portion presenting a radially extending inside shoulder, including a sealing and antithrust ring with a foot section positioned within the female end of the other tubular element supported against said inside shoulder, several retaining elements distributed in circumferential direction around the foot section and having an inside edge engaging the outside diameter of the male end of the one tubular member and a head section sealing the annular space between the female end and the male end of the tubular elements, characterized in that each retaining element is firmly embedded in a radially extending groove in a foot section consisting specifically of an elastomeric material harder than that of the head section and in that each retaining element in the assembled condition of the sealing and antithrust ring is directly supported for movement about a pivot axis by the inside wall of the female end of the other tubular member so as to be pivotable and in that each retaining element presents at least two inside edges intended to engage the outside diameter of the male end of the one tubular member which are spaced differently from the pivot axis axially and radially of the tubular members, depending upon the permissible diameter tolerance of the male end of the one tubular member, wherein the foot of each retaining element engages an annular recess between the inside shoulder and a female end inside, annular, radially extending counter surface spaced from and opposing said shoulder axially and is radially movable to a limited extent in said recess and has two clamping edges which are respectively supported by the inside shoulder and the counter-surface, are spaced from each other radially and are so disposed and designed that they wedge the foot of the retaining element tight in every radial position within the recess under the influence of axial forces to be absorbed and wherein at least one of the clamping edges or the counter-surfaces of the recess of the socket are roughened, such as by knurling, to increase the wedging action.

* * * * *